No. 784,239. PATENTED MAR. 7, 1905.
W. M. THOMAS.
VEHICLE SEAT.
APPLICATION FILED MAY 10, 1904.
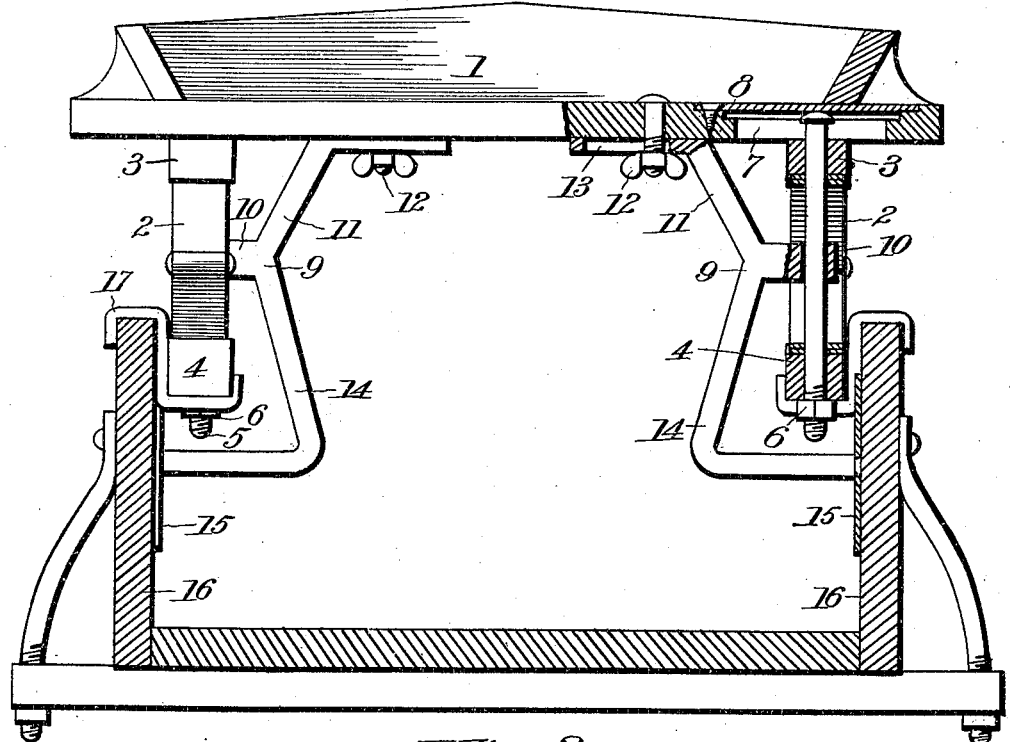
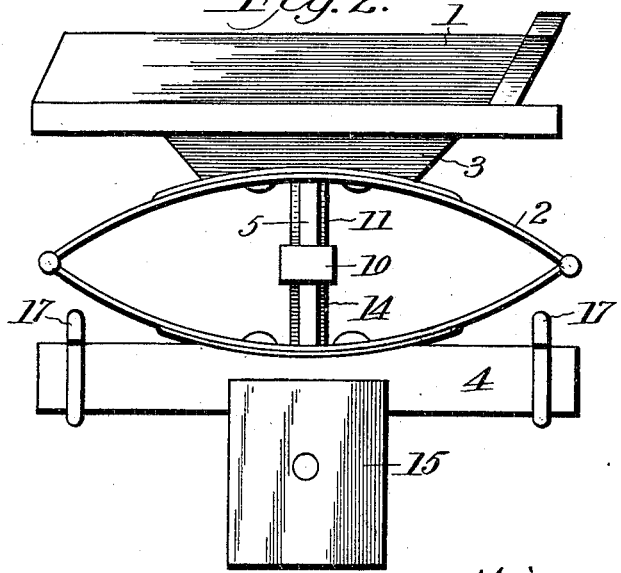

No. 784,239. Patented March 7, 1905.

UNITED STATES PATENT OFFICE.

WILLIAM MADISON THOMAS, OF GREENSBORO, ALABAMA.

VEHICLE-SEAT.

SPECIFICATION forming part of Letters Patent No. 784,239, dated March 7, 1905.

Application filed May 10, 1904. Serial No. 207,292.

*To all whom it may concern:*

Be it known that I, WILLIAM MADISON THOMAS, a citizen of the United States, residing at Greensboro, in the county of Hale and State of Alabama, have invented new and useful Improvements in Vehicle-Seats, of which the following is a specification.

This invention relates to improvements in vehicle-seats; and the object is to provide a simple and convenient construction of spring-seat which may be readily attached to and removed from the vehicle and which may be quickly adjusted for use with vehicles of different widths.

With the above objects in view the invention consists in the novel features of construction hereinafter fully described, particularly pointed out in the claims, and clearly illustrated by the accompanying drawings, in which—

Figure 1 is a front elevation, partly in section, of my improved seat positioned upon a wagon-body; and Fig. 2, a side elevation of the seat.

Referring now more particularly to the drawings, 1 designates the body of the seat, to the under side of which, near each end, the elliptical springs 2 are secured, being attached at their upper ends to blocks 3 and at their lower portions to bars 4. Passing through body 1 and loosely through the springs, at the center thereof, are bolts 5, which also extend through blocks 3 and bars 4 and are threaded on their lower ends to receive nuts 6. By adjusting the nuts the springs may be contracted or expanded to vary their resiliency. One of the blocks 3 is secured to the wagon-seat, while the other is free to slide thereon, bolt 5 at that end of the seat being movable in a slot 7 in the seat-body, which slot is covered by a plate 8.

9 9 designate irons having central portions 10, which project between the upper and lower portions of the elliptical springs and are perforated to receive the bolts 5, which pass loosely therethrough. Said irons are also provided with upwardly-extending portions 11, which are attached to the under side of the seat-body by bolts 12, one of said portions 11 being formed with a slot 13 to receive its securing-bolt, whereby the iron at that end of the seat may slide with the spring in adjusting the width of the seat. Said irons are provided with downwardly-extending portions 14, which are bent to extend beneath the bars 4, and attached to the ends thereof are the vertical plates 15, which engage the inner surface of the sides 16 of the vehicle. The seat is supported upon the vehicle by angle-arms 17, which hook over the upper edges of the vehicle sides and are carried by the bars 4.

By loosening the nuts of bolts 5 and 12 the movable spring and iron at that end of the seat may be adjusted longitudinally of the seat, whereby the seat may be used with vehicles of different widths. The seat is free to move vertically upon the springs, the bolts 5 being freely movable through the bars 4, which are held to the vehicle-body by the hooks 17. Plates 15 prevent displacement of the seat and hold it firmly in position upon the vehicle.

Having thus fully described my invention, what I claim as new, and desire to secure by Letters Patent of the United States, is—

1. In a vehicle-seat the combination with a seat-body, of end springs carried by the under side thereof, supporting-bars carried by the under side of said springs, bolts carried by the seat-body and passing loosely through the springs and supporting-bars and provided at their lower extremities with threaded portions, and nuts carried by the bolts and working in coöperation with the threaded portion to adjust the tension of the springs.

2. In a vehicle-seat the combination with a seat-body, of end springs carried by the under side thereof, supporting-bars carried by the under side of said springs, bolts carried by the seat-body and passing loosely through the springs and supporting-bars, and brackets carried by the seat-body and having downwardly-extending portions provided with laterally-extending perforated ears through which the bolts loosely pass.

3. In a vehicle-seat the combination with a seat-body, of end springs carried by the under side thereof, supporting-bars carried by the under side of said springs, bolts carried by the seat-body and passing loosely through the springs and supporting-bars, and brackets having central perforated portions through which said bolts loosely pass and provided with upwardly-extending portions attached to the seat-body and downwardly-extending portions bent outwardly at their lower extremities and carrying plates to bear against the inner sides of the vehicle-body.

4. In a vehicle-seat the combination with a seat-body provided with a longitudinally-extending slot, of elliptical end springs carried by the under side thereof, supporting-bars carried by the under side of said springs, bolts carried by the seat-body and passing loosely through the springs and supporting-bars, the head of one of the bolts being adapted to work within the slot in said seat-body, brackets having central perforated portions through which the bolts loosely pass and provided with upwardly-extending portions attached to the seat-body and downwardly-extending portions bent outwardly at their lower extremities beneath the supporting-bars and carrying plates to bear against the inner sides of the vehicle-body, one of said brackets being formed with a slot in the upper portion thereof, and a bolt carried by the seat-body and extending through said slot and carrying a nut.

In testimony whereof I have signed my name to this specification in the presence of two subscribing witnesses.

WILLIAM MADISON THOMAS.

Witnesses:
R. B. LOUIS,
S. B. SLEDGE.